(12) United States Patent
Hotaling et al.

(10) Patent No.: US 7,846,881 B2
(45) Date of Patent: Dec. 7, 2010

(54) LUBRICATION OF RUN-FLAT TIRE SYSTEM

(75) Inventors: Elizabeth L. Hotaling, Piedmont, SC (US); Laure M. Simonot, Greenville, SC (US); Brian R. Bergman, Clermont-Ferrand (FR)

(73) Assignees: Michelin Recherche et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 822 days.

(21) Appl. No.: 11/750,368

(22) Filed: May 18, 2007

(65) Prior Publication Data

US 2007/0251626 A1 Nov. 1, 2007

Related U.S. Application Data

(63) Continuation of application No. PCT/US2006/005479, filed on Feb. 16, 2006.

(51) Int. Cl.
*C10M 169/00* (2006.01)
(52) U.S. Cl. ........................... 508/136; 508/547
(58) Field of Classification Search .................. 508/136, 508/547
See application file for complete search history.

(56) References Cited

U.S. PATENT DOCUMENTS

| | | | |
|---|---|---|---|
| 3,942,573 A | 3/1976 | Lawrence et al. | |
| 4,036,765 A | 7/1977 | Conger et al. | |
| 4,045,362 A | 8/1977 | Kuan et al. | |
| 4,051,884 A | 10/1977 | Bourne et al. | |
| 4,607,675 A | 8/1986 | Patitsas et al. | |
| 5,939,475 A | 8/1999 | Reynolds et al. | |
| 6,036,765 A * | 3/2000 | Farrow et al. | ................ 106/487 |
| 6,534,570 B2 | 3/2003 | Farrow et al. | |
| 6,635,108 B1 | 10/2003 | Farrow et al. | |
| 6,750,181 B2 | 6/2004 | Salaun et al. | |
| 6,824,700 B2 * | 11/2004 | Iyengar et al. | ........... 252/62.52 |
| 6,944,948 B2 | 9/2005 | Pompier | |
| 7,041,626 B2 | 5/2006 | Salaun et al. | |
| 2004/0127369 A1 | 7/2004 | Belot et al. | |
| 2004/0147408 A1 | 7/2004 | Kollin | |
| 2006/0016535 A1 | 1/2006 | Mauclin et al. | |

FOREIGN PATENT DOCUMENTS

EP  1 400 377 A1  3/2004

OTHER PUBLICATIONS

International Search Report, PCT/US06/05479 dated Sep. 15, 2006.

* cited by examiner

*Primary Examiner*—Cephia D Toomer
(74) *Attorney, Agent, or Firm*—Frank J. Campigotto

(57) ABSTRACT

A lubricant composition for lubricating an interface between an inner surface of a tire and a safety support ring in a run-flat tire system that includes a lubricating agent selected from glycerol, polyalkylene glycol or combinations thereof and a thixotropic agent. The thixotropic agent is an organoclay comprising a mineral clay mixture treated with an alkyl quaternary ammonium salt, wherein the mineral clay mixture comprises at least one of sepiolite, palygorskite and a smectite and wherein a combined amount of palygorskite and sepiolite in the mineral clay mixture is between about 50 wt. % and about 100 wt. % with a balance of the mineral clay mixture being essentially the smectite. The lubricating agent may also be selected from a copolymer that is a mixture of alkylene oxides, preferably a mixture of ethylene oxide and propylene oxide.

14 Claims, 2 Drawing Sheets

LUBRICATION OF RUN-FLAT TIRE SYSTEM

This application is a continuation of International Application No. PCT/US2006/05479, filed Feb. 16, 2006.

BACKGROUND OF THE INVENTION

1. Field of the Invention

This invention relates generally to lubricants and more particularly, to lubricant compositions and methods for their use in a run-flat tire system.

2. Description of the Related Art

Run-flat tire systems have been developed to provide tires for vehicles that can be operated in a deflated condition for a suitable distance at a desired speed. Such systems have provided significant benefits to vehicle operators including safety benefits that are realized when, for example, a vehicle can continue traveling with a deflated tire under conditions that are not safe for changing the tire at the side of a road. Thus, run-flat tire systems improve the safety of the vehicle by allowing the vehicle to continue to travel for a certain time until a suitable place for repairs can be found.

Run-flat systems having safety support rings are well known. U.S. Pat. No. 6,944,948 of Pompier, which has been assigned to Michelin Recherche et Technique, discloses such a system. Pompier discloses a run-flat tire system having a safety support ring consisting of a circular body adapted for fitting onto a wheel rim of a vehicle. The disclosed safety support ring is comprised of a vulcanized rubber mix and includes areas that are reinforced by, for example, metallic or textile wires or cables. While Pompier discloses a safety support ring made of a vulcanized rubber mix, the support rings are not so limited and may be made, for example, of plastics such as polyurethane.

As Pompier discloses, safety support rings are generally mounted on a wheel rim inside a tire to provide support for the crown of the tire when it is rolling at low or zero pressure. The safety support ring is meant to prevent direct contact between the tire and the wheel rim because such contact generally results in rapid deterioration of the tire.

To improve rolling under the condition of low or zero pressure, it is preferable to provide lubrication at the interface between the inside surface of the tire and the surface of the support ring. Such lubrication promotes extended durability in the friction zones that are subjected to relatively high temperatures due to the friction between the surfaces if no lubrication is provided.

One example of a lubricant composition that has been used for lubricating the interface between the inside surface of a tire and the surface of a safety support ring is disclosed in U.S. Pat. No. 6,750,181 of Salaun, et al, which has been assigned to Michelin Recherche et Technique. The lubricant composition disclosed by Salaun includes an aqueous or nonaqueous lubricating agent and a polysaccharide intended to thicken the lubricating agent. A preferred lubricating agent is disclosed as glycerin.

Salaun further discloses that the preferred lubricating composition has a viscosity of between 100,000 centipoise and 160,000 centipoise at 25° C. and at atmospheric pressure, measured in accordance with the "Brookfield" technique by means of a spindle designated "LV4." Salaun further discloses that the polysaccharide used as a thickening agent makes it possible to impart a thixotropic nature to the lubricating composition.

As known to those having ordinary skill in the art, a thixotropic material is a pseudoplastic non-Newtonian fluid that, after undergoing shear thinning, has the potential to have its structure reformed when allowed to rest over a period of time. A pseudoplastic fluid has a viscosity that decreases as the applied shear rate increases and that decreases at a constant applied shear rate. The process of applying a shear rate to decrease viscosity is called shear thinning, Therefore, a thixotropic material that is a gel, for example, may become a free-flowing liquid when subjected to shear thinning but upon the cessation of the applied shear rate, the structure of the material may reform and convert back to a gel over time as the material rests.

Another example of a lubricant composition that has been used in a run-flat tire system is disclosed in the PCT patent application WO2004/069565 of Mauclin, et al., which has been assigned to Michelin Recherche et Technique. Mauclin discloses a lubricating composition that includes a lubricating agent and a thickening agent, the preferred lubricating agents being an alkene oxide polymer. The preferred thickening agent is disclosed as being fumed silica.

Generally, the lubricant compositions of the run-flat tire system may be applied to the surface of the safety support ring, the inside surface of the tire or both. The thickening agent added to the lubricant composition is intended to increase the viscosity of the lubricating agent so as to minimize the flowing of the lubricating agent due to its weight when the vehicle is at rest or is traveling with its tires inflated. If the lubricating agent does not remain in place, then the tire may become unbalanced and affect the smoothness of the ride.

Some lubricants having a thixotropic nature have had problems remaining in place after having been subjected to an intermittent shear that causes their viscosity to decrease, thereby turning the lubricant into a flowing fluid. Such intermittent shear may occur, for example, when the tire hits a bump in the road causing the tire to deflect so that the inner surface of the tire momentarily contacts the surface of the safety support ring, thereby imparting shear to the thixotropic lubricant. Such intermittent contact may also occur, for example, during tight cornering.

Therefore, even though the literature includes many different lubricants that are disclosed as being suitable for a run-flat tire system, there is still a need for an improved lubricant. There is a need for a lubricant that does not flow after undergoing intermittent shear caused, for example, by the tire hitting a bump in the road or being subjected to tight cornering.

SUMMARY OF THE INVENTION

Particular embodiments of the present invention provide a lubricant composition for lubricating an interface between an inner surface of a tire and a safety support ring in a run-flat tire system. The lubricant composition comprises a lubricating agent selected from glycerol, polyalkylene glycol or combinations thereof and an organoclay thixotropic agent. The organoclay thixotropic agent comprises a mineral clay mixture treated with an alkyl quaternary ammonium salt, wherein the mineral clay mixture comprises at least one of sepiolite, palygorskite and a smectite and with between about 50 wt. % and about 100 wt. % of the mineral clay mixture being palygorskite, sepiolite or a mixture of the palygorskite and the sepiolite, the a balance of the mineral clay mixture being essentially the smectite.

The lubricating agent in particular embodiments of the lubricant composition may be glycerol. The lubricating agent may also be selected from a copolymer that is a mixture of alkylene oxides, preferably a mixture of ethylene oxide and propylene oxide. In particular embodiments of the present invention, the lubricating agent is a copolymer of ethylene oxide and propylene oxide having units resulting from the ethylene oxide of between about 40 and about 80 mole percent, preferably between about 50 and about 70 mole percent.

The organoclay thixotropic agent is added to the lubricant composition in an amount that provides the composition with the desired thixotropic properties. Particular embodiments of the lubricant composition may include the thixotropic agent in an amount that is greater than about 5 wt. %, is between about 3 and about 40 wt. %, between about 10 and about 30 wt. % or between about 10 and about 40 wt. %. Particular embodiments of the present invention include adding the thixotropic agent in an amount that is less than about 40 wt. % or less than about 30 wt. %.

Particular embodiments of the lubricant composition may be characterized as having a viscosity of between about 10 and about 60 Pa·s when measured at 20° C. under a shear rate of 10 s$^{-1}$ on a cone and plate rheometer. Particular embodiments of the lubricant composition may further be characterized as having an initial threshold stress value TS1 of greater than about 50 Pa or greater than around 150 Pa. Particular embodiments of the present invention include a lubricant composition having a TS1 of between about 200 and 500 Pa or between about 275 and about 325 Pa. Particular embodiments of the lubricant composition may also be characterized as having a recovered threshold stress value TS2 that is at least 50% of TS1, preferably at least about 25% of TS1 and more preferably at least about 10% of TS1.

Other embodiments of the present invention include methods for lubricating an interface between an interior surface of a tire and an outer surface of a safety support in a run-flat tire system using the lubricant composition of the present invention. Such a method includes providing a lubricant composition at the interface, wherein the lubricant composition comprises a lubricating agent and a thixotropic agent. In particular embodiments, the thixotropic agent is at least 5 wt. % of the lubricant composition. The lubricant composition is the same as described above.

Other embodiments of the present invention include run-flat tire systems that utilize the lubricant composition of the present invention. Such systems may include a tire and safety support mounted on a wheel rim, the lubricant composition of the present invention disposed in an interface between an outer surface of the safety support ring and an inner surface of the tire.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF PREFERRED EMBODIMENTS

Figure 1:
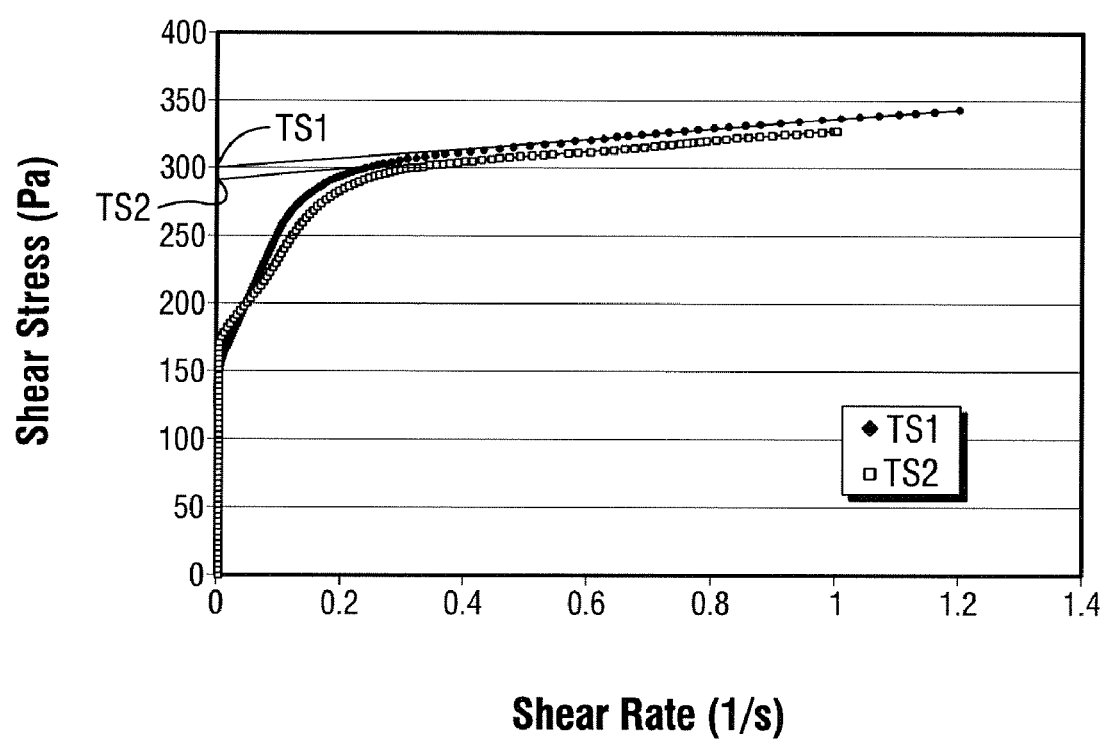
FIG. 1 is a graph of the shear rate plotted against the shear stress obtained from a cone-plate rheometer to determine the initial threshold stress value TS1 and the recovered threshold stress value TS2 of a lubricant composition in accordance with the present invention.

The present invention includes a lubricant composition useful for lubricating the interface between the inside of a tire and the surface of a safety support ring for a run-flat tire system. The invention further includes run-flat tire systems having safety support rings that use the lubricant composition and methods for using the lubricant composition.

In particular embodiments of the present invention, a lubricant composition is provided that includes a lubricating agent and a thixotropic agent that imparts a tlhixotropic character to the lubricant composition. Non-limiting examples of suitable lubricating agents include diols, triols, tetrols, polyhydric alcohols, glycol ethers, glycerin or mixtures thereof Preferred lubricating agents include one or more polyoxyalkylenes, especially polyalkylene glycols. Examples of preferred polyalkylene glycols include polyethylene glycol, polypropylene glycol, polybutylene glycol or mixtures thereof.

Particular embodiments of the lubricant composition include a copolymer that is a mixture of alkylene oxides, preferably mixtures of ethylene oxide and propylene oxide polymers. A preferred copolymer comprises units resulting from ethylene oxide in a preferred mole fraction of between about 40% and about 80% (more preferably between about 50% and about 70%), and units resulting from propylene oxide in a preferred mole fraction of between about 20% and about 60% (more preferably, between about 30% and about 50%). When selecting a polyalkylene glycol lubricating agent, consideration should be given to hygiene issues such as those disclosed in the literature, e.g., ECETOC, European Centre for Ecotoxicology and Toxicology of Chemicals, Technical Report No. 55, *Pulmonary Toxicity of Polyalkylene Glycols*, Brussels, December 1997, ISSN-0773-8072-55.

Particular embodiments of the lubricant composition include lubricating agents that may be characterized as having an apparent viscosity of between about 100 and about 2,000 centipoise (1 centipoise=1 mPa·s) and more particularly between about 500 and about 1,600 centipoise when measured at 23° C. in accordance with European and International standard EN ISO 2555 (June 1999) (viscosity by the Brookfield method; rotating viscometer of type A; rotation speed 20 RPM; mobile No. 2; model RVT).

The lubricant composition should be compatible with all the components of the run-flat tire system in which the lubricant composition is being used. Such components of the run-flat system may include, for example, the tire, the safety support ring, the wheel, the electronic pressure monitor and any chemicals or lubricants applied separately to these or other components.

For example, the lubricant composition should be compatible with any of the materials that may be used for the inside of the tire and/or for the safety support ring. Preferred materials for the safety support ring include, for example, natural and synthetic rubbers as well as polymers such as polyurethane or thermoplastic elastomerg (TPE). These materials, as well as the other components of the run-flat tire system, should be subjected to an aging test with the lubricant composition to determine their compatibility by using methods known to those having ordinary skill in the art. A lubricant-free control sample of each material should also be subjected to an identical aging test for comparison. Material measurements—notably weight, dimensions, Shore hardness, and tensile strength—should be made before and after the aging test. Changes to the critical characteristics of the materials caused by lubricant incompatibility may alter the performance and/or acceptability of the system. Such changes may include, for example, swelling, shrinking, hardening, softening, becoming more or less brittle and/or changing color.

Examples of suitable ethylene oxide and propylene oxide copolymer lubricating agents that are available commercially include SYNALOX 40D300 and UCON 75H1400, which are available from Dow Chemical Company; BREOX 60W460 and BREOX 60W320, which are available from Cognis Corporation having offices in Cincinnati, Ohio; and CLARIANT D21/300, which is available from Clariant Corporation having offices in Charlotte, N.C.

In particular embodiments of the lubricant composition, glycerin is used as the lubricating agent. A suitable glycerin for use in the present invention is commercially available under the trade name SUPEROL from Procter & Gamble, Cincinnati, Ohio. SUPEROL is 99.7% pure glycerol and produces a superior lubricant composition as compared to STAR glycerin, also a Procter & Gamble product, which is only 96% pure glycerol.

Particular embodiments of the present invention include the lubricant composition having a thixotropic agent. Surprisingly, there is an organoclay that imparts the desired thixotropic properties to the lubricant composition of the present invention. While it is known to mix thickening agents, including clays, with lubricating agents to form a lubricant composition for use in run-flat tire systems, these thickening agents have not imparted the desired thixotropic properties to the lubricant compositions.

The desired thixotropic properties of the present invention may be characterized by the initial threshold stress value (TS1) of the lubricant composition and by the recovered threshold stress value (TS2) of the lubricant composition, which is determined after the lubricant composition has undergone a set amount of shear stress and then allowed to recover. The procedure for measuring the TS1 and the TS2 threshold stress values of a lubricant composition is provided in Example 2 of the examples section that follows.

The desired thixotropic properties of the present invention provide a lubricant composition that does not flow under its own weight when at rest, that does not flow well when subjected to shear stress levels that are less than TS1, and that upon cessation of the shear stress, returns to a form having a TS2 that is at least 50% of TS1. Preferably, the material returns to a TS2 that is within at least 25% of TS1 and more preferably, within at least 10% of TS1. In particular embodiments of the present invention, the lubricant composition has a initial threshold stress TS1 greater than about 50 Pa and preferably greater than about 150 Pa. A suitable range for TS1 may be between about 200 and about 500 Pa and more particularly, between about 275 and about 325 Pa.

High threshold stress values of the lubricant composition are desired because they relate to maintaining the balance of the lubricant composition in the tire. Vehicle operators demand that the tires on their cars perform at a minimum level of noise and vibration. If the lubricant composition moves around inside the tire during normal operation, the balance of the tire may become affected and cause the tire to become unbalanced, thereby causing excessive noise and vibration.

Viscosity of the lubricant composition may be controlled by adjusting the amount of lubricating agent in the lubricant composition. Though not limiting the invention, particular embodiments of the lubricant composition of the present invention have a viscosity of between about 10 and about 60 Pa·s and preferably between about 20 and about 50 Pa·s at 20° C. under a shear rate of $10 \, s^{-1}$ as measured on a cone and plate rheometer.

Those having ordinary skill in the art may adjust the amount of lubricating agent according to the particular nature and geometry of the safety support ring or other components of the particular run-flat system in order to avoid the risks due to excessively high or excessively low fluidity of the lubricant composition. The risks associated with excessively high fluidity include the parasitic drainage of the lubricant composition while at rest, which may cause wheel-balance problems during subsequent normal operating conditions, i.e., at normal inflation pressure. The risks associated with excessively low fluidity include the non-uniform distribution of the lubricant composition around the safety support ring during flat running operating conditions, which would typically cause an adverse effect on the overall endurance of the tire and safety support ring.

Particular embodiments of the present invention provide a lubricant composition that possesses the desired thixotropic and lubricant characteristics when operating over a wide range of outside weather temperatures such as, for example, between about −40° C. and about 55° C.

The thixotropic agent that imparts the desired thixotropic properties to the lubricant composition of the present invention is a mineral clay mixture that has been treated with an alkyl quaternary ammonium compound and comprises sepiolite, palygorskite or mixtures thereof. A preferred mineral clay mixture that has been treated with an alkyl quaternary ammonium compound includes at least one of sepiolite, palygorskite and a smectite with between about 50-100 wt. % sepiolite, palygorskite or a mixture of sepiolite and palygorskite, the balance smectite.

A preferred organoclay suitable for use as the thixotropic agent is commercially available under the trade name GARAMITE from Southern Clay Products, Gonzales, Tex. The GARAMITE organoclay comprises a clay mixture that has been treated with a quaternary ammonium compound, preferably an alkyl quaternary ammonium salt, 50-95 wt. % sepiolite, palygorskite or a mixture of the two, with the balance of the clay mixture being smectite, as set forth in U.S. Pat. No. 6,036,765.

Both sepiolite and palygorskite are included in the phyllosilicates because they contain a continuous two-dimensional tetrahedral sheet of composition $T_2O_5$ (T=Si, Al, Be . . . ) but they differ from other layer silicates in lacking continuous octahedral sheets. Smectite or smectite-type clays refer to the general class of clay minerals with expanding crystal lattices, with the exception of vermiculite. This includes the dioctahedral smectites that consist of montmorillonite, beidelite, and nontronite and to the trioctahedral smectites that includes saponite, hectorite and sauconite. Also included are the synthetically prepared smectite clays.

In particular embodiments of the present invention, the thixotropic agent is added to the lubricant composition in an amount that is at least 5 wt. % of the total weight of the lubricant compound, between about 10 and 30 wt. % or between about 3 and 40 wt. %. Particular embodiments of the present invention include adding the thixotropic agent in an amount that is less than about 40 wt. % or less than about 30 wt. % of the total weight of the lubricant composition.

In particular embodiments of the present invention, the lubricant composition may include one or more additives such as, for example, antioxidants, coloring compounds, bactericides, ionic, non-ionic surfactants or mixtures thereof. The total content of such additives in the lubricant composition is preferably, but not limited to, less than about 2 wt. %. Particular embodiments of the present invention may further include other thickeners or thixotropic agents in the lubricant composition so that a lesser amount of the organoclay need be added to achieve the desired thixotropic properties of the lubricant composition.

In some applications, it may be advantageous to mix the components of the lubricant composition at an elevated temperature, dry the thixotropic agent before mixing into the lubricant composition, deaerate the lubricant composition after mixing or combinations thereof. When the organoclay and lubricating agent were mixed at an elevated temperature of 75° C., it was found that the increased temperature had no deleterious effect on the final lubricant composition. Such heating may be advantageous during mixing in order to incorporate chemicals into the grease, shorten mixing time or adapt to an industrial process constraint.

Test results indicated that drying the organoclay at 105° C. before mixing the clay into the lubricant composition also improved the rheological properties of the lubricant composition by increasing both the threshold stress of the material and the viscosity. Improvements were seen in the rheological properties of the lubricant composition as drying time was increased to about 2 hours but for longer times, test results indicated that the rheological properties degenerated.

Test results also indicated that deaerating the lubricant composition improved the rheological properties of the lubricant by increasing both the threshold stress of the material and the viscosity. The lubricant composition was deaerated by placing it under a vacuum for about 12 hours.

The invention is further illustrated by the following examples, which are to be regarded only as illustrations and not delimitative of the invention in any way.

EXAMPLE 1

This example provides a procedure for mixing the components of the lubricant composition. In general, a higher shear and longer mixing times are required, as compared to some known lubricant compositions, to ensure good dispersion of the organoclay throughout the composition.

Approximately 26 g of an organoclay (GARAMITE 1958) and approximately 174 g of a lubricating agent (SYNALOX 40D300) were measured out separately and combined by hand mixing to make a lubricant composition having 13 wt. % organoclay. The organoclay was added to the lubricating agent in fourths and mixed until no powder was visible. The mixture was then mixed at 1000 RPM in an overhead mixer (LIGHTNIN Model L1U08F) for 15 minutes. The mixer was then stopped so that the sides could be scraped down towards the center of the bowl. The composition was then mixed for 5 minute periods at 1000 RPM with the bowl scraped towards the middle after each period until the total mixing time had reached about 30 minutes, Once the lubricant composition had been mixed, the lubricant composition was allowed to rest for about 24 hours to allow the lubricant composition to restructure.

It should be noted that the same procedure was used with glycerin as the lubricating agent but the mixing did not take as long. After mixing the organoclay by hand with the glycerin (SUPEROL glycerin, available from Proctor & Gamble of Cincinnati, Ohio), the mixture was mixed at 1000 RPM for 10 minutes. The mixer was then stopped so that the sides could be scraped down towards the center of the bowl. The composition was then mixed for a 5 minute period at 1000 RPM for a total mixing time of 15 minutes.

EXAMPLE 2

This example provides the procedure for measuring the threshold stress value of a lubricant composition including both the initial threshold stress value (TS1) and the recovered threshold stress value (TS2) that is measured after the composition has been subjected to an amount of shear stress, as set in the procedure that follows, and then allowed to recover.

The rheological properties were measured on the THERMO HAAKE RheoStress1 cone-plate rheometer with a 35 mm diameter titanium cone having 4 degrees of angle and a truncation of 0.143 mm. The tests were typically run at 20° C.

A sample of the lubricant composition measuring approximately 1.5 g was placed on the center of the plate of the rheometer. The cone part descended rapidly until the gap between the plate and the cone was less than about 6 mm. The cone part slowed its descent at that point to about 0.2 mm/min to avoid shearing the sample too much and to avoid introducing air bubbles in the sample. After the working gap (0.143 mm) was reached, any excess sample was carefully removed with a spatula from the border of the cone to ensure that no lubricant composition remained on the sides of the cone.

The sample was subjected to a controlled shear rate of $0.5\ s^{-1}$ for a period of 200 seconds. The sample was then allowed to rest for 600 seconds. The rheometer then applied an initial shear stress of 1.0 Pa and linearly increased the shear stress to 1000 Pa over a 1000 second period. The shear stress was recorded as a function of the shear rate over this period of time. FIG. 1 is a graph of the shear rate plotted against the shear stress obtained from the rheometer during the procedure. The initial threshold stress value TS1 of the lubricant composition, as shown on FIG. 1, was determined by obtaining the X=0 intercept by linear regression analysis of the stress versus shear rate between the shear rate values of 0.7 and $1.5\ s^{-1}$.

The sample was then allowed to rest for 600 seconds without any shear applied and then the sample was subjected to a controlled shear rate of $0.3\ s^{-1}$ for 300 seconds during which time the viscosity of the sample was measured. Viscosities were then typically measured at 0.3, 1, 3 and $10\ s^{-1}$ and then again at $3\ s^{-1}$ as a final measurement. Taking these viscosity readings subjected the lubricant composition to stress so that a recovered threshold stress value TS2 of the worked lubricant composition could be measured after the viscosity readings were obtained.

To determine the recovered threshold value TS2 of the lubricant composition after being subjected to the shear forces during the acquisition of the viscosity measurements, the lubricant composition was subjected to a linear controlled stress increase from 1 Pa to 600 Pa over a 700 second period. The same method using linear regression analysis was then used to determine TS2 as was used to determine TS1. The result is shown as TS2 on FIG. 1. As may be seen in FIG. 1, the recovered threshold stress value TS2 of the worked lubricant composition is nearly the same (about 97%) as the initial threshold stress value TS1 of the lubricant composition.

Figure 2A:
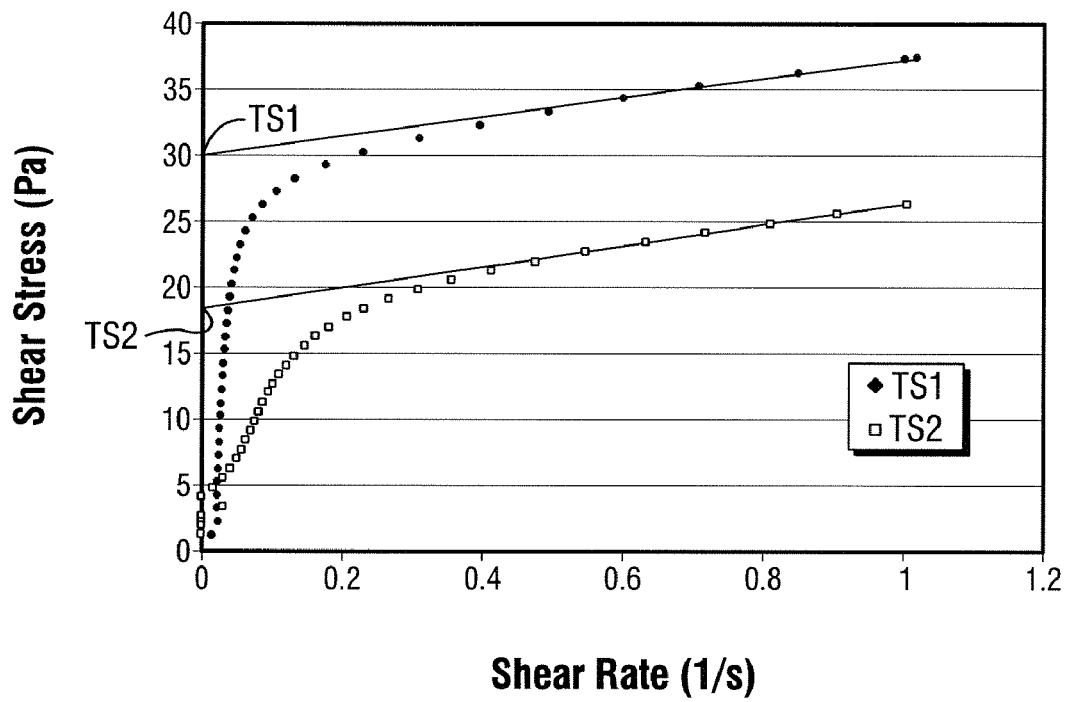
FIGS. 2A-2B are graphs of the shear rate plotted against the shear stress obtained from a cone-plate rheometer to determine the initial threshold stress value TS1 and the recovered threshold stress value TS2 of lubricant compositions using thickening agents other than the organoclay of the present invention.
Figure 2B:
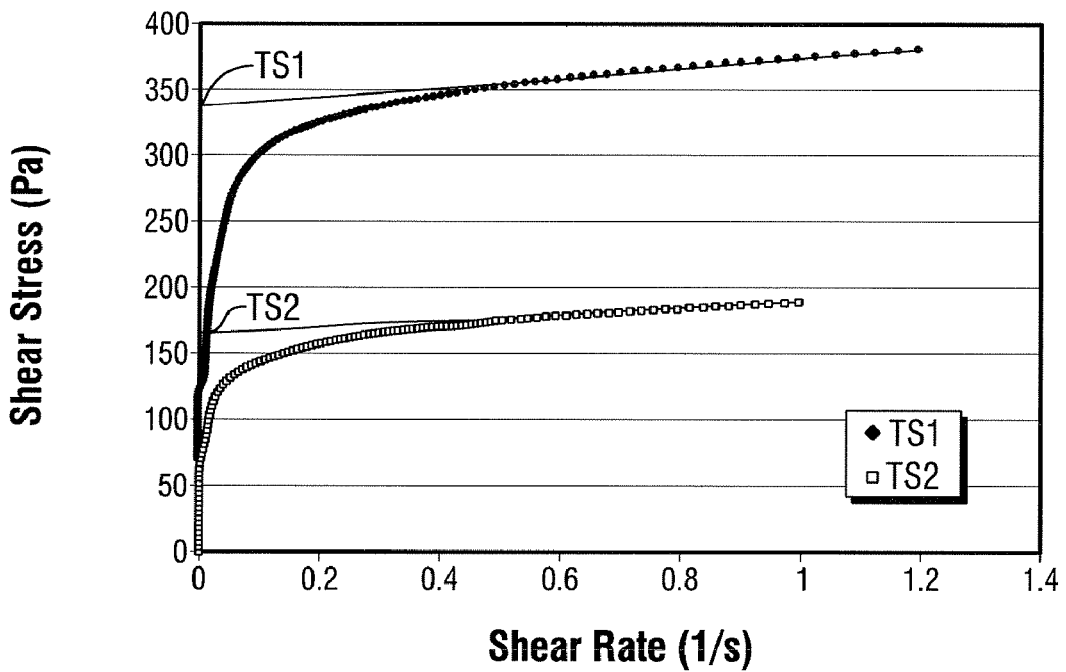

FIGS. 2A-2B show the differences between the initial threshold stress value TS1 and the recovered threshold stress value TS2 of the lubricant compositions of the prior art. The lubricant composition used to generate FIG. 2A was the lubricant composition disclosed in U.S. Pat. No. 6,750,181, which disclosure is hereby fully incorporated by reference. The lubricant composition used to generate FIG. 2B was the lubricant composition disclosed in PCT patent application WO2004/069565. The TS1 and TS2 values shown in FIGS. 2A-2B, when compared with the values shown in FIG. 1, illustrate the improvement of the present invention over the prior art. The lubricant composition illustrated in FIG. 2A has a TS1 of only about 30 Pa, which is less than the desired threshold value of greater than 50 Pa. While the lubricant composition illustrated in FIG. 2B has a TS1 of about 340 Pa, the recovered threshold value TS2 is only about 170 Pa, which is only 50% of the TS1. By contrast, the lubricant composition of the present invention has a TS1 of about 300 Pa and a TS2 of about 290 Pa, or about 97% of the TS1, as shown in FIG. 1.

EXAMPLE 3

This example demonstrates that most clays are not suitable for use as the thixotropic agent in accordance with the present invention. Several samples of lubricant composition were prepared by the method disclosed in Example 1. The clay-based thickening agents were all obtained from Southern Clay Products. SUPEROL glycerin and SYNALOX 4OD300 were used as the lubricating agents. The thickening agent was added to the lubricant composition to produce (1) a lubricant composition having the polyalkylene glycol lubricating agent and 13 wt. % clay or (2) a lubricant composition having the glycerin lubricating agent and 11 wt. % clay. These lubricant compositions were then tested according to the method provided in Example 2. The results, shown in Tables 1 and 2, demonstrate that the GARAMITE organoclays provide a suitable thixotropic agent for use in accordance with the present invention while the other clays do not.

tions were suitable as lubricants in a run-flat tire system. The proposed ISO 16992 testing procedure runs the test over a defined distance and if the run-flat system can run for that defined distance without failure, then the system is considered adequate for a run-flat tire system. However, the test results provided in this example were obtained by running the test until failure in order to discriminate between the different lubricants used during the tests.

A run-flat tire (235-710R460 PAX tire) and safety support ring (80-460(55) polyurethane support ring) were assembled in a run-flat tire system assembly with the test lubricant provided on the inner surface of the tire. The assembly was mounted on a spindle in a test chamber, the tire was inflated to 2.5 bar and the test chamber was adjusted to provide a chamber temperature of 38° C. The tire was loaded to 65% of the maximum rated load for the tire. The assembly was left for 3 hours to "soak" in the heated chamber.

TABLE 1

Results of Thickener Testing with 11 wt. % Thickener in Glycerin

| | Thickener Specifications | Lubricant Composition Rheology | | |
|---|---|---|---|---|
| | | TS1 | TS2 | Viscosity* |
| Product Name | Description[†] | (Pa) | (Pa) | (Pa · s) |
| Na Cloisite | untreated montmorillonite clay | 0.2 | −1.4 | 2.4 |
| Cloisite 20A | montmorillonite treated with surfactant 2M2HT (dimethyl, dehydrogenated tallow, quaternary ammonium) | 3.3 | 2.0 | 3.1 |
| Cloisite 25A | montmorillonite treated with surfactant 2MHTL8 (dimethyl, dehydrogenated tallow, 2-ethylhexyl quaternary ammonium) | 2.4 | 1.6 | 2.9 |
| Cloisite 30B | montmorillonite clay treated with surfactant MT2EtOH (methyl, tallow, bis-2-hydroxyethyl, quaternary ammonium) | 10.5 | 5.5 | 6.9 |
| Garamite 1958 | sepiolite/palygorskite/smectite treated with surfactant | 322 | 282 | 45.4 |

*Viscosity at 20° C. under a shear rate of 10 s$^{-1}$ as measured on a cone and plate rheometer.
[†]Description as provided through Supplier product bulletins.

TABLE 2

Results of Thickener Testing with 13 wt. % Thickener in a Polyalkylene Glycol

| | Thickener Specifications | Lubricant Composition Rheology | | |
|---|---|---|---|---|
| | | TS1 | TS2 | Viscosity* |
| Product Name | Description[†] | (Pa) | (Pa) | (Pa · s) |
| Na Cloisite | untreated montmorillonite clay | 0.7 | 1.0 | 2.6 |
| Cloisite 20A | montmorillonite treated with surfactant 2M2HT (dimethyl, dehydrogenated tallow, quaternary ammonium) | 3.3 | 1.9 | 4.8 |
| Cloisite 25A | montmorillonite treated with surfactant 2MHTL8 (dimethyl, dehydrogenated tallow, 2-ethylhexyl quaternary ammonium) | 1.8 | 0.6 | 3.5 |
| Cloisite 30B | montmorillonite clay treated with surfactant MT2EtOH (methyl, tallow, bis-2-hydroxyethyl, quaternary ammonium) | 1.4 | 0.6 | 3.2 |
| Garamite 1958 | sepiolite/palygorskite/smectite treated with surfactant | 276 | 276 | 41.2 |

*Viscosity at 20° C. under a shear rate of 10 s$^{-1}$ as measured on a cone and plate rheometer.
[†]Description as provided through Supplier product bulletins.

EXAMPLE 4

This example provides test results of lubricant compositions tested under a modified version of the proposed ISO 16992. The proposed ISO 16992 test had not been formally approved as an ISO standard. The tests performed in this example were used to determine whether lubricant composi- After the soak, the tire was deflated and the tire assembly was run at 80 kph under a steering protocol. The results of the tire testing are shown in Table 3, wherein it is demonstrated that the lubricant compositions using Garamite 1958 as the thixotropic agent are good lubricant compositions for use in a run-flat tire system.

TABLE 3

Results of Run-Flat Tire System Test

| Formulation | | Rheological Properties at 20° C. | | Viscosity at 10 s$^{-1}$ (Pa · s) | Tire Test Results | |
|---|---|---|---|---|---|---|
| Thickener (wt %) | Base Oil (Supplier) | TS1 (Pa) | TS2 (Pa) | | Gel Quantity (cm$^3$) | ISO Run-flat Distance (km) |
| Polysaccharide (1.5) | Glycerin 90% | 30 | 19 | 3.30 | | * |
| Silica (6.3) | Emkarox VG379W (Uniqema) | 237 | 133 | 32.7 | 80 | 390 |
| Garamite 1958 (12) | Synalox 40D300 (Dow) | 285 | 293 | 38.9 | 80 | 388 |
| Garamite 1958 (13) | Breox 60W460 (Cognis) | 302 | 297 | 46.7 | 80 | 355 |
| Garamite 1958 (11) | Superol Glycerine (Procter & Gamble) | 322 | 282 | 45.4 | 120 | 340 |

* Not tested; gel industrialized before development of ISO test.

EXAMPLE 5

This example includes test results of lubricant compositions used in tire testing. The test method included mounting an assembly of a run-flat tire system, which included a tire (235-710R460 PAX tire), safety support ring (80-460(55) polyurethane), a wheel having a 23 cm radius and a lubricant composition in accordance with the present invention, on a test spindle.

The assembly was first tested to determine the imbalance vector of the tire wheel assembly using methods known to those having ordinary skill in the art. Then the assembly was subjected to a severe 5000 km endurance test on a road wheel. After a 72 hour period following the endurance test, during which time the tire assembly was stored, the imbalance vector of the assembly was again measured to determine the amount of lubricant composition that shifted during the endurance test. Also, the TS1 and viscosity of the lubricant composition were measured both before and after the endurance test.

The test results provide the change in the imbalance vector of the tire wheel assembly before the endurance test and after the endurance test. The greater the difference in the two imbalance vectors, the greater the amount of movement of the lubricant composition within the assembly. A large enough change in the imbalance vector will result in noticeable ride deterioration for the driver. As may be seen from Table 4, the Garamite 1958 organoclay provides the smallest change in the imbalance vector.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

TABLE 4

Results of Road Wheel Test

| Formulation | | Lubricant Rheology Before Test | | Test Results | Lubricant Rheology After Test | |
|---|---|---|---|---|---|---|
| Thickener (wt. %) | Base Oil (Supplier) | TS1 (Pa) | Viscosity at 10 s$^{-1}$ (Pa · s) | Δ Imbalance Vector (g cm) | TS1 (Pa) | Viscosity at 10 s$^{-1}$ (Pa · s) |
| Polysaccharide (1.5) | Glycerin 90% | 30 | 3.3 | 851 | 0.4 | 2.1 |
| Silica (6.3) | Emkarox VG379W (Uniqema) | 237 | 32.7 | 506 | 36 | 6.5 |
| Garamite 1958 (12) | Synalox 40D300 (Dow) | 285 | 38.9 | 414 | 130 | 18.3 |

What is claimed is:

1. A lubricant composition for lubricating an interface between an inner surface of a tire and a safety support ring in a run-flat tire system, the lubricant composition comprising:
    a lubricating agent selected from glycerol, polyalkylene glycol or combinations thereof; and
    a thixotropic agent, wherein the thixotropic agent is. an organoclay comprising a mineral clay mixture treated with an alkyl quaternary ammonium salt and wherein the mineral clay mixture comprises at least one of sepiolite, palygorskite and a smectite and wherein between about 50 wt. % and about 100 wt. % of the mineral clay mixture is the palygorskite, the sepiolite or a mixture of the palygorskite and the sepiolite, the balance being essentially the smectite.

2. The lubricant composition of claim 1, wherein the lubricating agent is glycerol.

3. The lubricant composition of claim 1, wherein the polyalkylene glycol is a copolymer of a mixture of alkylene oxides.

4. The lubricant composition of claim 3, wherein the polyalkylene glycol is a copolymer of ethylene oxide and propylene oxide having units resulting from the ethylene oxide of between about 40 and about 80 mole percent.

5. The lubricant composition of claim 4, wherein the polyalkylene glycol includes units resulting from the ethylene oxide of between about 50 and about 70 mole percent.

6. The lubricant composition of claim 1, wherein the lubricating agent includes polyethylene glycol, polypropylene glycol, polybutylene glycol or combinations thereof.

7. The lubricant composition of claim 1, wherein the lubricant composition includes the thixotropic agent in an amount of between about 3 wt. % and about 40 wt. %.

8. The lubricant composition of claim 1, wherein the lubricant composition includes the thixotropic agent in an amount of betWeen about 10 wt. % and about 30 wt. %.

9. The lubricant composition of claim 1, wherein the lubricant composition includes the thixotropic agent in an amount greater than about 5 wt. %.

10. The lubricant composition of claim 1, wherein the smectite is selected from hectorite, montmorillonite, bentonite, beidelite, saponite, stevensite or mixtures thereof.

11. The lubricant composition of claim 1, wherein an initial threshold stress value TS1 of the lubricant composition is greater than about 50 Pa.

12. The lubricant composition of claim 1, wherein an initial threshold stress value TS1 of the lubricant composition is greater than about 150 Pa.

13. The lubricant composition of claim 12, wherein a recovered threshold stress value TS2 of the lubricant compositionis at least about 50% of the initial threshold stress value TS1.

14. The lubricant composition of claim 1, wherein a viscosity of the lubricant composition is between about 10 and about 60 Pa·s when measured at 20° C. under a shear rate of $10 \text{ s}^{-1}$ on a cone and plate rheometer.

* * * * *